United States Patent [19]

Tadokoro et al.

[11] Patent Number: 5,016,232
[45] Date of Patent: May 14, 1991

[54] MAGNETO-OPTIC INFORMATION-CARRYING MEDIUM INCLUDING THREE MAGNETIC LAYERS

[75] Inventors: Michihiro Tadokoro; Kazuo Okada; Hitoshi Imai, all of Hyogo, Japan

[73] Assignee: Mitsubishi Denki Kabushiki Kaisha, Tokyo, Japan

[21] Appl. No.: 490,324

[22] Filed: Mar. 8, 1990

Related U.S. Application Data

[63] Continuation-in-part of Ser. No. 155,728, Feb. 16, 1988, abandoned.

[30] Foreign Application Priority Data

Apr. 3, 1987 [JP] Japan ................................. 62-83391

[51] Int. Cl.$^5$ .......................... G11B 7/24; G11B 13/04; G11B 11/12
[52] U.S. Cl. ...................................... 369/13; 428/694; 428/900; 360/131; 365/122
[58] Field of Search ................. 369/13; 360/59, 114, 360/131; 365/122; 428/694, 900

[56] References Cited

U.S. PATENT DOCUMENTS

| | | | |
|---|---|---|---|
| 3,521,294 | 7/1970 | Treves | 360/59 |
| 4,293,621 | 10/1981 | Togami | 428/678 |
| 4,649,519 | 3/1987 | Sun et al. | 365/122 |
| 4,670,356 | 6/1987 | Sato et al. | 428/693 |
| 4,799,114 | 1/1989 | Tsunashima | 360/59 |
| 4,855,975 | 8/1989 | Akasaka et al. | 369/13 |
| 4,871,614 | 10/1989 | Kobayashi | 369/13 |

FOREIGN PATENT DOCUMENTS

| | | |
|---|---|---|
| 0180459 | 5/1986 | European Pat. Off. . |
| 0217096 | 4/1987 | European Pat. Off. ............. 369/13 |
| 0227480 | 7/1987 | European Pat. Off. ............ 360/114 |
| 0258978 | 3/1988 | European Pat. Off. . |
| 2546655 | 11/1984 | France . |
| 61-22455 | 1/1986 | Japan . |
| 60-177455 | 1/1986 | Japan . |

OTHER PUBLICATIONS

J. S. Judge et al., "Magnetic Memory Device Utilizing Coupled Film", vol. 10, No. 2, Jul. 1967 of IBM Technical Disclosure Bulletin, pp. 144-145.

"Single Beam Over Write Method Using Multipayered Magneto Optical Media", 28p-ZL-3, Extended Abstracts (The 34th Meeting) The Japan Society of Applied Physics & Related Societies, 3/28/87.

Primary Examiner—Stuart S. Levy
Assistant Examiner—Hoa Nguyen
Attorney, Agent, or Firm—Fleit, Jacobson, Cohn, Price, Holman & Stern

[57] ABSTRACT

A magneto-optic information-carrying medium comprises three magnetic layers. A magnetic bias field is generated by a third layer which is premagnetized in the direction parallel to the thickness thereof.

8 Claims, 4 Drawing Sheets

NEW DATA | OLD DATA

NEW DATA | OLD DATA

NEW DATA | OLD DATA

NEW DATA | OLD DATA

MAGNETO-OPTIC INFORMATION-CARRYING MEDIUM INCLUDING THREE MAGNETIC LAYERS

This application is a continuation-in-part of application Ser. No. 07/155,728, filed on 2/16/88, now abandoned.

BACKGROUND OF THE INVENTION

This invention relates to a magneto-optic information-carrying medium that enables direct overwriting of new information and old information.

FIGS. 3A and 3B illustrate the principle of the prior art of magneto-optic information reading and writing as shown in "Single Beam Over Write Method Using Multilayered Magneto Optical Media", 28p-ZL-3, Extended Abstracts (The 34th Spring Meeting, 1987); The Japan Society of Applied Physics and Related Societies. FIG. 3A shows an oblique view; FIG. 3B is cross-sectional view showing the main parts. The apparatus in these drawings comprises a magneto-optic information-carrying medium 1, which in turn comprises a glass or plastic substrate 2 and two ferromagnetic or ferrimagnetic layers: a first layer 3 and a second layer 4. The apparatus also comprises an objective lens 5 for focusing a laser beam onto the information-carrying medium 1, where it forms a focused spot 6. Reference numeral 7 designates a region on the first layer 3 where binary data "1" is recorded by magnetization in the upward direction in FIG. 3B. The apparatus also comprises two magnets: an initializing magnet 8 for creating an initial magnetic alignment in the second layer 4; and a bias magnet 9 located opposite the objective lens 5 on the other side of the information-carrying medium 1.

This apparatus operates as follows. A support and drive mechanism not shown in the drawings turns the information-carrying medium 1 in a fixed direction (indicated by arrow a in the drawing). The first layer 3, which is positioned on the incident side of the laser beam, has properties similar to those of the recording layer of the information-carrying media used in ordinary magneto-optic discs, and also operates as a recording layer in the apparatus under discussion. The second layer 4, called the supplementary layer, is provided to enable overwriting; that is, to enable new data to be written over old data directly. Let Tc1 and Tc2 be the Curie temperatures of the first layer 3 and second layer 4, and let Hc1 and Hc2 be the coercive forces of first layer 3 and second layer 4, respectively. These parameters of the two layers satisfy the following relationships:

Tc1 < Tc2
Hc1 > Hc2

Let us first consider the reading of information recorded on the recording layer, that is, the first layer 3. The objective lens 5 is driven by a driving mechanism not shown in the drawings in the direction of its optic axis and in a direction perpendicular to its optic axis (the radial direction of the information-carrying medium) so as to keep the spot 6 in focus and on the track on the recording layer.

As shown in FIG. 3B, the recording layer is magnetized parallel to its direction. The magnetic alignment is either up or down in the drawing, these two directions corresponding to "0" and "1" of binary codes. Magnetization in the up direction in the drawing represents "1. 38 When the information is read, the spot 6 is focused onto the first layer 3. The magnetic alignment of the first layer is converted to optical information through a well-known magneto-optic effect (such as the Kerr effect); thus the information on the information-carrying medium 1 is detected. The intensity of the laser beam on the information-carrying medium 1 in this reading operation is equivalent to intensity a in FIG. 4. At this intensity the temperatures of regions of the first layer 3 and second layer 4 illuminated by the focused spot 6 do not reach their Curie temperatures Tc1 and Tc2, so the focused spot 6 do not erase the recorded information, that is, the magnetic alignment.

Information is overwritten as follows. The information-carrying medium 1 is subject to an external magnetic field Hini (indicated by arrow b in the drawing) generated by initializing magnet 8 in FIG. 3B. The external magnetic field is related to the coercive forces of the first layer 3 and second layer 4 as follows:

Hini < Hc1
Hini > Hc2

As the information-carrying medium 1 rotates in direction a in FIG. 3B, when the second layer 4 passes over the initializing magnet 8 it is uniformly magnetized in the up direction, regardless of the magnetic alignment of the first layers 3. At room temperature the first layer 3 retains its existing magnetic alignment, being unaffected by the magnetic field generated by the initializing magnet 8 or the magnetic field generated by the magnetization of the second layer 4.

To write the information "1," that is, to magnetize the first layer 3 in the up direction, the laser beam is modulated to an intensity equivalent to b in FIG. 4. The temperature of the region of the first layer 3 where the spot 6 is focused by the objective lens 5 then rises until it exceeds the Curie temperature Tc1 of the first layer 3, destroying the magnetic alignment of the first layer 3. The second layer 4, however, remains below its Curie temperature Tc2, so it retains the upward magnetic alignment given it by the initializing magnet 8. When the region of the first layer 3 illuminated by the focused spot 6 cools, it therefore acquires the upward magnetic alignment in accordance with that of the second layer 4.

To write the information "0," that is to magnetize the first layer 3 in the down direction, the laser beam is modulated to an intensity equivalent to c in FIG. 4. In this case the temperatures in the regions illuminated by the focused spot 6 on the first layer 3 and the second layer 4 rise until they exceed the Curie temperatures Tc1 and Tc2, respectively, causing both layers to lose their magnetic alignment. Due to a weak external magnetic field Hb, with magnetic alignment indicated by arrow c in the drawing, generated by the bias magnet 9 located opposite the objective lens 5 on the other side of the information-carrying medium 1, however, the second layer 4 is remagnetized in the direction of the magnetic field Hb, namely the down direction. When the first layer 3 cools, it acquires the downward magnetic alignment of the second layer 4. In this way the first layer 3 is magnetized in the downward direction. The intensity of the external bias field Hb is weak but within the range consistent with the above operation.

As described above, new information can be overwritten directly on old information by modulating the laser beam between intensities b and c in FIG. 4 in accordance with the binary codes "1" and "0".

When the magneto-optic information-carrying medium is structured as in the prior art described above, however, it is difficult to achieve a simple, compact apparatus configuration because the bias magnet must be placed in alignment with the objective lens on the opposite side of the information-carrying medium.

SUMMARY OF THE INVENTION

An object of this invention is to solve the problems stated above.

Another object of this invention is to provide a magneto-optic information-carrying medium that does not require a bias magnet to be mounted in the apparatus.

According to the invention, there is provided a magneto-optic information-carrying medium comprising
a first layer
a second layer
and a third layer,
wherein these layers are magnetic layers and are stacked on a substrate in the above order as seen from the side illuminated by laser beam for writing or reading information, and the third layer is premagnetized in a uniform direction parallel to the thickness thereof.

The provision of a third layer completely eliminates the need for an external bias magnet as in the prior art. The optical reading and writing apparatus can therefore be small in size and simple in structure, without the complexity of the configuration in which a bias magnet is mounted opposite the objective lens. In addition, the bias magnetic field has a uniform effect on the second layer, because the third layer that generates the bias field is in direcct contact with the second layer.

DETAILED DESCRIPTION OF THE PREFERRED EMBODIMENTS

Figure 1A:
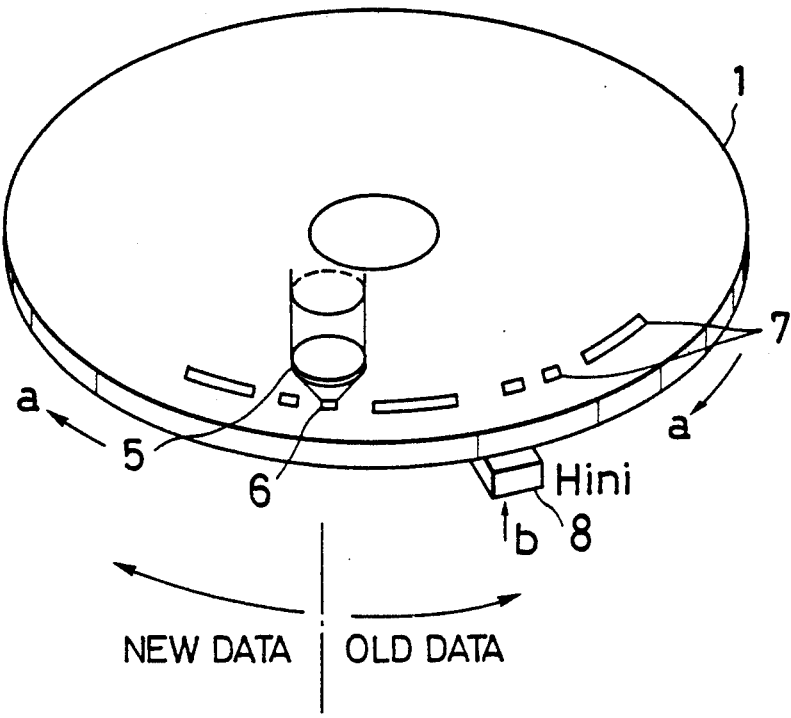
FIG. 1A is an oblique view of a first embodiment of the present invention showing how the invention is used.
Figure 1B:
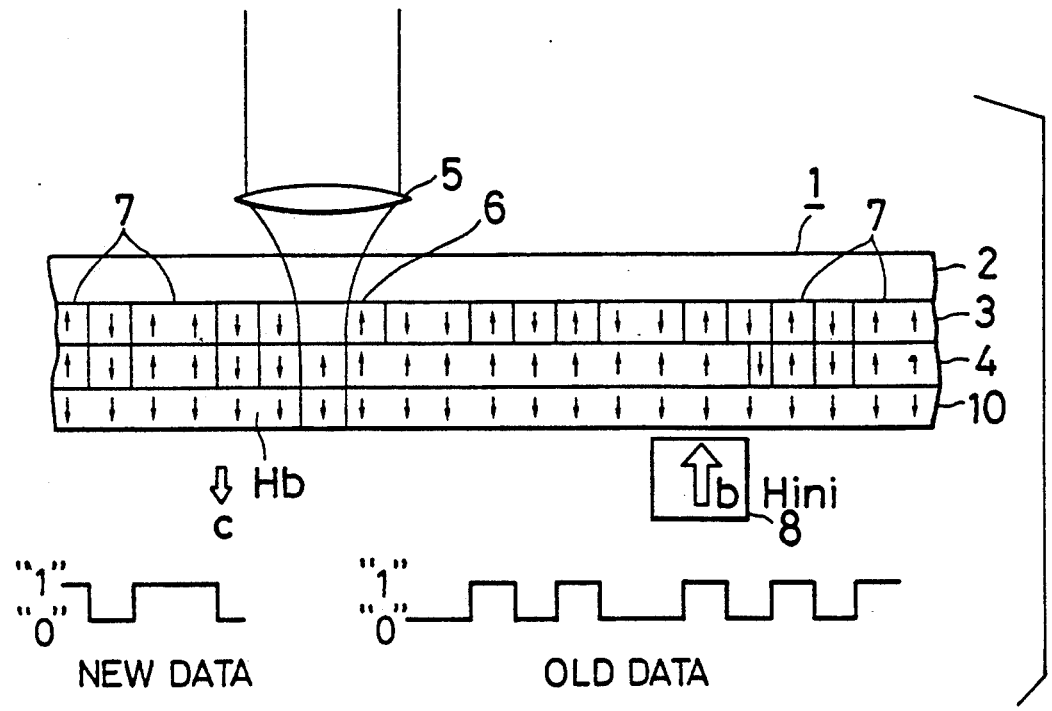
FIG. 1B is a cross-sectional view of the first embodiment of the present invention indicating how information is written.

An embodiment of this invention will now be described with reference to the drawings. Elements 1 through 8 in FIGS. 1A and 1B are the same as in the prior art. The additional element is a third layer 10 of ferromagnetic or ferrimagnetic material. The information-carrying medium 1 basically comprises a substrate 2 and three ferromagnetic layers 3, 4 and 10. These layers have axes of easy magnetization in the direction parallel to the thickness thereof.

This embodiment operates as follows.

The information-carrying medium 1 is rotated in the direction of the arrow a in the drawing. The three ferromagnetic or ferrimagnetic layers of the information-carrying medium 1 are stacked so that, as seen from the side on which the laser beam is incident, the first layer 3 is on top, the second layer 4 is in the middle, and the third layer 10 is at the bottom. The first layer 3 possesses the same properties as the recording layer in the information-carrying media used in ordinary magneto-optic discs. Information is recorded in this layer. The second layer 4 and third layer 10, which are called supplementary layers, are provided to enable overwriting. Let $Tc1$, $Tc2$ and $Tc3$ be the Curie temperatures of the first layer 3, the second layer 4 and the third layer 10, and let $Hc1$, $Hc2$ and $Hc3$ be coercive forces of the first layer 3, the second layer 4 and the third layer 10 respectively. These parameters of the three layers satisfy the following relationships:

$Tc1 < Tc2 < Tc3$ $Hc1 > Hc3 > Hc2$, or $Hc1 > Hc2$ and $Hc3 > Hc2$

The third layer 10 is uniformly premagnetized preferably during fabrication of the medium, so that the resulting magnetic field lines of the magnetic field Hb generated in the third layer 10, point in the down direction (the direction of arrow c in FIG. 1B). The magnetic field Hb resulting from the magnetization of the third layer 10 is too weak to affect the magnetic alignment of the first layer 3 and second layer 4 at room temperature.

Information recorded in the recording layer (the first layer 3) is read as follows. The objective lens 5 is driven as in the prior art to keep a spot 6 in focus on the recording surface and keep it on an information track. Information is then read from the information-carrying medium 1 by detecting the direction of magnetic alignment (parallel to the thickness of the layer: up or down in the drawing) of the first layer 3 by means of a magneto-optic effect. The intensity of the laser beam at the time of reading is equivalent to the intensity a in FIG. 4. At this intensity the regions of the first layer 3, the second layer 4 and the third layer 10 illuminated by the focused spot 6 do not reach their Curie temperatures $Tc1$, $Tc2$ and $Tc3$, so the focused spot 6 does not erase the recorded information by destroying the magnetic alignment.

Information is overwritten as follows. The initializing magnet 8 in FIG. 1B generates as external field Hini (indicated by arrow b in the drawing). The external field Hini is related to the coercive forces of the first layer 3, the second layer 4 and the third layer 10 as follows:

$Hini < Hc1$
$Hini > Hc2$
$Hini < Hc3$

Accordingly, as the information-carrying medium 1 rotates in direction a in FIG. 1B, when the second layer 4 passes over the initializing magnet 8 it is uniformly magnetized in the up direction in the drawing, regardless of the magnetic alignment of the first layer 3 and the third layer 10. The magnetic field generated by the second layer 4 is weaker than the coercive force Hc1 of the first layer 3 and the coercive force Hc3 of the third layer 10, so at room temperature it does not affect the magnetic alignment of the first layer 3 and the third layer 10.

Figure 4:
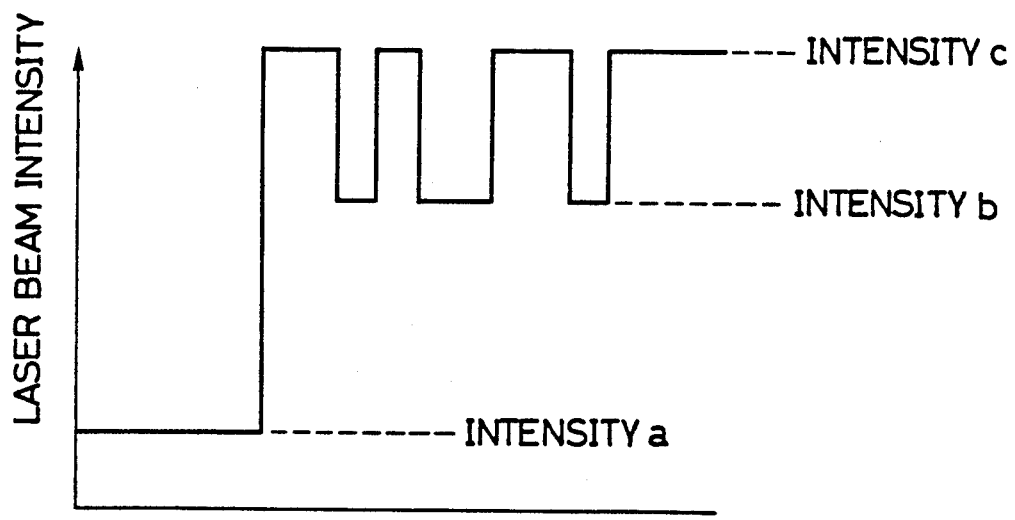
FIG. 4 indicates the intensity modulation of the laser beam.

To write the information "1," that is, to magnetize the first layer 3 in the up direction, the laser beam is modulated to an intensity equivalent to b in FIG. 4. The temperature of the region of the first layer 3 where the spot 6 is focused by the objective lens 5 then rises until it exceeds the Curie temperature Tc1 of the first layer 3, destroying the magnetic alignment of the first layer 3. The temperatures of second layer 4 and third layer 10, however, remain below their Curie temperatures Tc2 and Tc3, so the second layer 4 retains the upward magnetic alignment by the initializing magnet 8 and the third layer 10 retains its original down alignment.

The first layer 3 is subject to the magnetic fields generated by both the second layer 4 and the third layer 10, but as stated previously, the magnetic field Hb of the third layer 10, which is aligned in the downward direction of the arrow c, is weak; the magnetic field of the second layer 4, which is aligned in the upward direction of the arrow b, has a stronger effect on the first layer 3. Therefore, the region of the first layer 3, which was illuminated by the focused spot 6 and the temperature of which raised above its Curie temperature Tc1, acquires the magnetic alignment of the second layer 4 at the time of cooling. The result is that the first layer 3 is magnetized in the up direction.

To write the information "0," that is, to magnetize the first layer 3 in the down direction, the laser beam is modulated to an intensity equivalent to c in FIG. 4. Due to the higher beam intensity, in this case the temperatures in the regions illuminated by the focused spot 6 on the first layer 3 and the second layer 4 rise until they exceed the Curie temperatures Tc1 and Tc2, causing both the first layer 3 and the second layer 4 to lose their magnetic alignments in the regions illuminated by the focused spot 6. The temperature in the region illuminated by the focused spot 6 on the third layer 10, however, does not reach the Curie temperature Tc3 of that layer, causing the third layer 10 to retain the magnetic field Hb. The second layer 4 is therefore remagnetized in reverse in the down direction by the magnetic field Hb. When the first layer 3 cools, it acquires the downward magnetic alignment of the second layer 4. As a result the first layer 3 is magnetized in the down direction.

To summarize the above explanation:

[1] When the Curie temperature Tc1 is exceeded, the magnetic alignment of the second layer 4 is transferred to the first layer 3.

[2] At room temperature, the second layer 4 is uniformly magnetized in the up direction by the magnetic field Hini of the initializing magnet 8, regardless of the magnetic alignments of the first layer 3 and the third layer 10.

[3] When the Curie temperature Tc2 is exceeded, the magnetic field Hb of the third layer 10 magnetizes the second layer 4 in the down direction.

Information can thus be overwritten in the manner explained above by modulating the intensity of the laser beam between intensities b and c in FIG. 4.

The provision of a third layer 10 in the information-carrying medium 1 of this invention and its uniform premagnetization in the down direction as described above not only ensures that the effect of the magnetic bias field Hb on the second layer 4 is constant; but also eliminates the need for an external bias magnet 9. The optical reading and writing apparatus can therefore be small in size and simple in structure, without the complexity of the configuration in which a bias magnet 9 is mounted in a position opposite the objective lens 5.

Figure 2A:
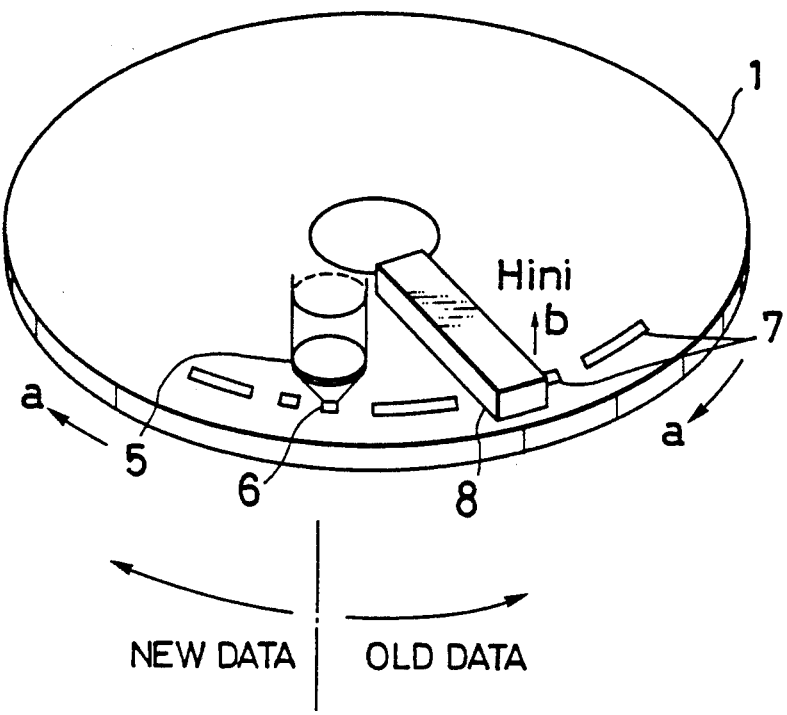
FIG. 2A is an oblique view of a second embodiment of the present invention showing how the invention is used.
Figure 2B:
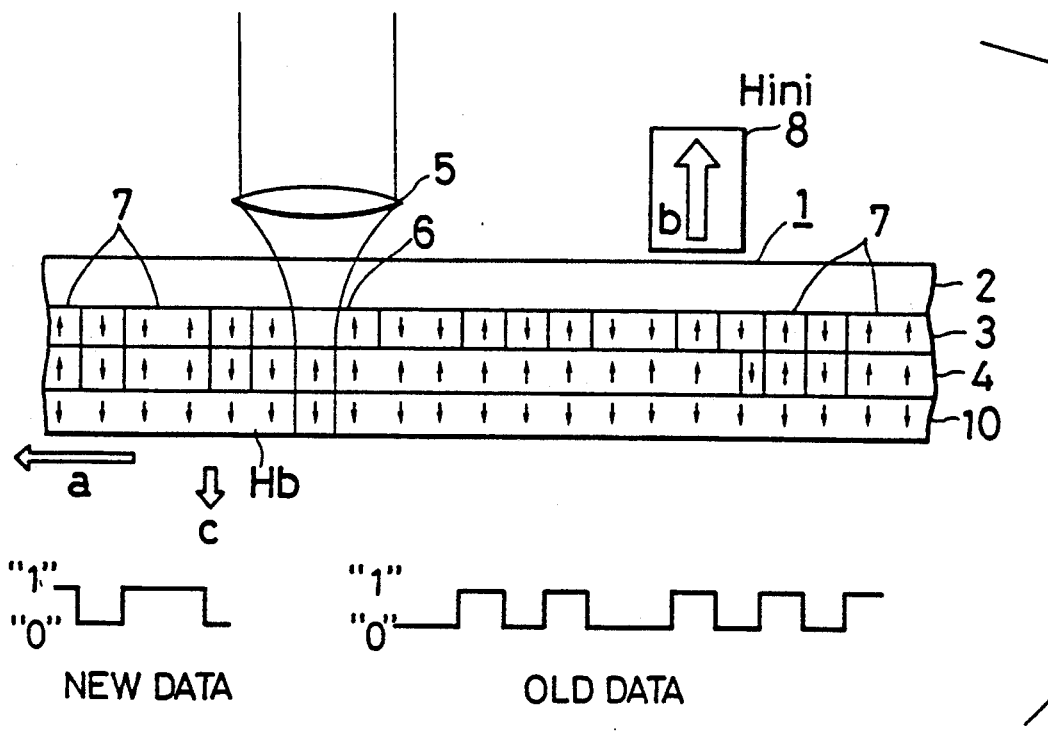
FIG. 2B is a cross-sectional view of the second embodiment of the present invention indicating how information is written.
Figure 3A:
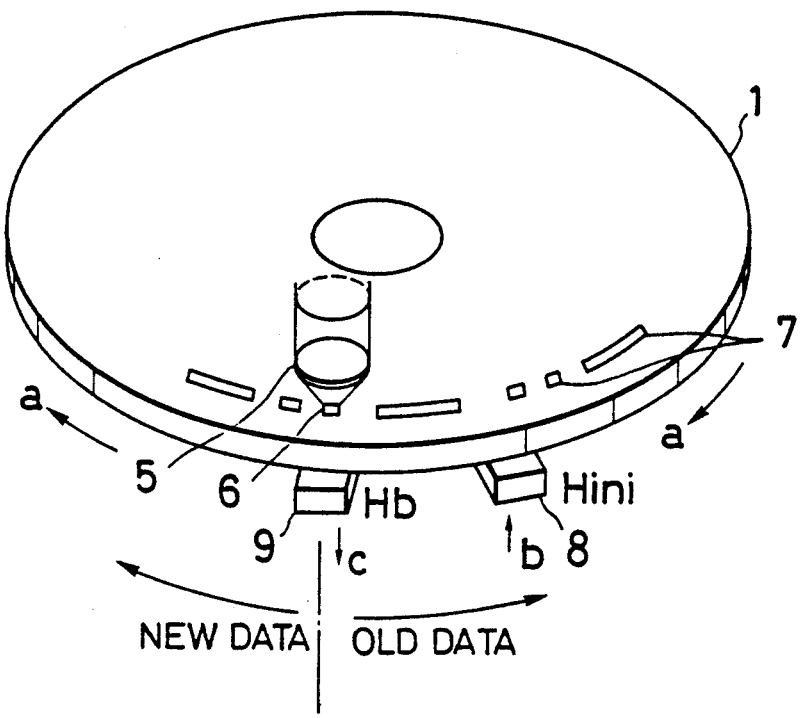
FIG. 3A is an oblique view of the prior art showing how the prior art is used.
Figure 3B:
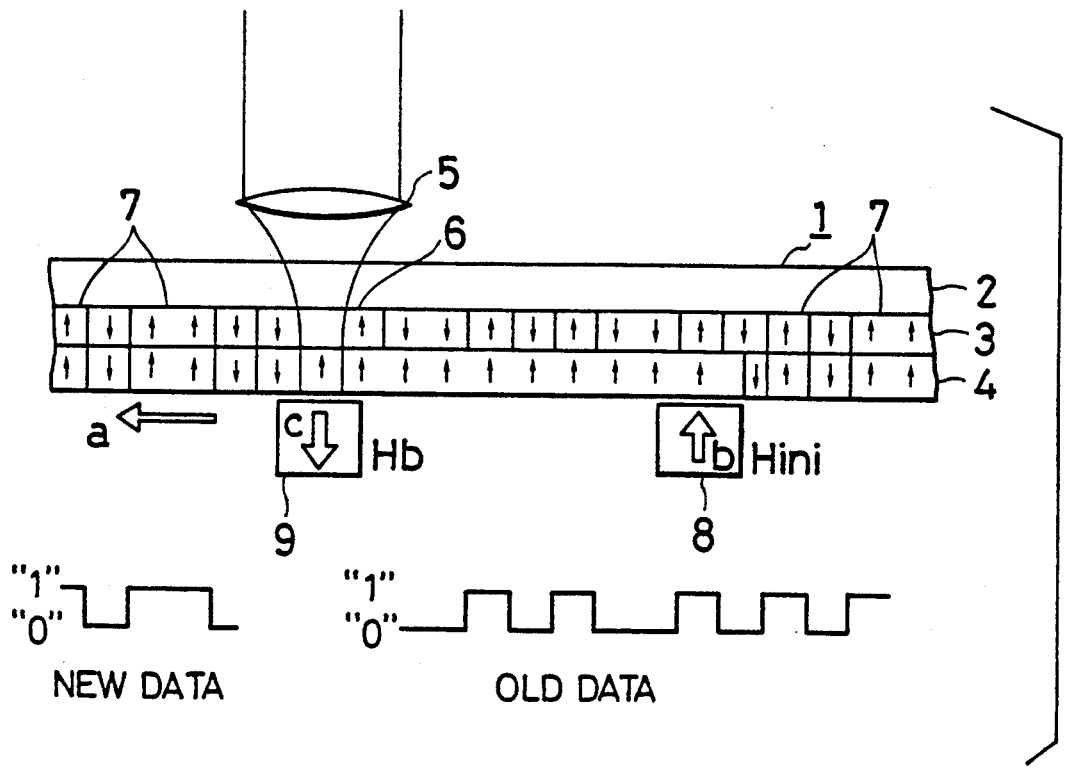
FIG. 3B is a cross-sectional view of the prior art indicating how information is written.

Another embodiment of this invention is shown in FIGS. 2A and 2B. In this embodiment the initializing magnet 8 is placed on the same side of the informtion-carrying medium 1 as the objective lens 5. This enables the apparatus to be made still more compact.

In the above embodiments the initializing magnetic field Hindi pointed up and the magnetic bias field Hb pointed down (in the direction of the substrate 2), but the opposite arrangement, in which Hindi points down and Hb points up (in the direction opposite the substrate 2), is also possible. The effect of the invention remains the same.

What is claimed is:

1. A magneto-optic information carrying medium comprising:

a recording magneto-optic layer having a first Curie temperature Tc1 and a first coercive force Hc1;

an auxiliary magneto-optic layer having a second Curie temperature Tc2 and a second coercive force Hc2;

a bias magnetic layer having a third Curie temperature Tc3 and a third coercive force Hc3;

said recording magneto-optic layer, said auxiliary magneto-optic layer, and said bias magnetic layer being stacked on each other;

said bias magnetic layer being premagnetized to generate a magnetic field weaker than is necessary to reverse the direction of magnetization of said recording magneto-optic layer and said auxiliary magneto-optic layer at a temperature below their respective Curie temperatures, and sufficiently strong enough to magnetize said recording magneto-optic layer and said auxiliary magneto-optic layer when said recording magneto-optic layer and said auxiliary magneto-optic layer have reached their respective Curie temperature to destroy the magnetic alignments therein;

said auxiliary magneto-optic layer having a weaker coercive force than said recording magneto-optic layer and said bias magnetic layer so that when an external initializing magnetic field Hini satisfying:

$Hc2 < Hini < Hc1$, $Hini < Hc3$ is applied to said medium in a predetermined direction, said auxiliary magneto-optic layer is magnetized in said predetermined direction of said external initializing magnetic field while said recording magneto-optic layer and said bias magnetic layer remain unchanged;

said recording magneto-optic layer having a lower Curie temperature than said auxiliary magneto-optic layer and said bias magnetic layer so that when the layers are heated to a first temperature T1 satisfying:

$Tc1 < T1 < Tc2$, $T1 < Tc3$ said recording magneto-optic layer reaches its respective Curie temperature to destroy the magnetic alignment therein, while said auxiliary magneto-optic layer and said bias magnetic layer do not reach their respective Curie temperatures to maintain the magnetic alignment therein;

said auxiliary magneto-optic layer having a lower Curie temperature than said bias magnetic layer so that when the layers are heated to a second temperature T0 satisfying:

$Tc2 < T0 < Tc3$ said auxiliary magneto-optic layer reaches its Curie temperature to destroy the magnetic alignment therein, while said bias magnetic layer does not reach its respective Curie temperature to maintain the magnetic alignment therein;

whereby when the layers are heated to said first temperature, said recording magneto-optic layer is magnetized by the magnetic field in said auxiliary magneto-optic layer upon said auxiliary magneto-optic layer being allowed to cool provided that the magnetic field in said auxiliary magneto-optic layer is stronger than the magnetic field in said bias magnetic layer, and when the layers are heated to said second temperature said recording magneto-optic layer and said auxiliary magneto-optic layer are magnetized in the direction of the field in said bias magnetic layer;

a substrate permitting transmission of a laser beam for writing and reading information, said laser beam being used for said heating of said layers; and wherein said recording magneto-optic layer is stacked on said substrate and adjacent therewith, said auxiliary magneto-optic layer is stacked on said recording magneto-optic layer and adjacent therewith, and bias magnetic layer is stacked on said auxiliary magneto-optic layer and adjacent therewith.

2. A medium according to claim 1, wherein said layers have axes of easy magnetization in the direction of the thickness thereof.

3. A medium according to claim 1, wherein said bias magnetic layer comprises a layer of a ferromagnetic material.

4. A medium according to claim 1, wherein said bias magnetic layer is premagnetized in a direction opposite to said predetermined direction of said external initializing magnetic field.

5. A magneto-optic information carrying medium comprising:

a recording magneto-optic layer having a first Curie temperature $Tc1$ and a first coercive force $Hc1$;

an auxiliary magneto-optic layer having a second Curie temperature $Tc2$ and a second coercive force $Hc2$;

a bias magnetic layer having a third Curie temperature $Tc3$ and a third coercive force $Hc3$;

said recording magneto-optic layer, said auxiliary magneto-optic layer, and said bias magnetic layer being stacked on each other;

said bias magnetic layer being premagnetized to generate a magnetic field weaker than is necessary to reverse the direction of magnetization of said recording magneto-optic layer and said auxiliary magneto-optic layer at a temperature below their respective Curie temperatures, and strong enough to magnetize said recording magneto-optic layer and said auxiliary magneto-optic layer when said recording magneto-optic layer and said auxiliary magneto-optic layer have reached their respective Curie temperatures to destroy the magnetic alignments therein;

said auxiliary magneto-optic layer having a smaller coercive force than said recording magneto-optic layer and said bias magnetic layer so that when an external initializing magnetic field $Hini$ satisfying:

$Hc2 < Hini < Hc1$, $Hini < Hc3$ is applied to said medium in a predetermined direction, said auxiliary magneto-optic layer is magnetized in said predetermined direction of said external initializing magnetic field while said recording magneto-optic layer and said bias magnetic layer remain unchanged;

said recording magneto-optic layer having a lower Curie temperature than said auxiliary magneto-optic layer and said bias magnetic layer so that when the layers are illuminated with a laser beam having a first intensity to heat the layers to a first temperature $T1$ satisfying:

$Tc1 < T1 < Tc2$, $T1 < Tc3$ said recording magneto-optic layer reaches its respective Curie temperature to destroy the magnetic alignment therein, while said auxiliary magneto-optic layer and said bias magnetic layer do not reach their Curie temperatures to maintain the magnetic alignment therein;

said auxiliary magneto-optic layer having a lower Curie temperature than said bias magnetic layer so that when the layers are illuminates with a laser beam having a second intensity to heat the layers to a second temperature $T0$ satisfying:

$Tc2 < T0 < Tc3$ said auxiliary magneto-optic layer reaches its respective Curie temperature to destroy the magnetic alignment therein, while said bias magnetic layer does not reach its Curie temperature to maintain the magnetic alignment therein; and whereby when the layers are illuminated with a laser beam of said first intensity, said recording magneto-optic layer is magnetized by the magnetic field in said auxiliary magneto-optic layer upon said auxiliary-optic layer being allowed to cool provided that the magnetic field in said auxiliary magneto-optic layer is stronger than the magnetic field in said bias magnetic layer, and when the layer are illuminated with a laser beam of said second intensity said recording magneto-optic layer and said auxiliary magneto-optic layer are magnetized in the direction of the magnetic field in said bais magnetic layer;

a substrate permitting transmission of said laser beam for writing and reading information; and wherein said recording magneto-optic layer is stacked on said substrate and adjacent therewith, said auxiliary magneto-optic layer is stacked on said recording magneto-optic layer and adjacent therewith, and said bias magnetic layer is stacked on said auxiliary magneto-optic layer and adjacent therewith.

6. A medium according to claim 5, wherein said layers have axes of easy magnetization in the direction of the thickness thereof.

7. A medium according to claim 5, wherein said bias magnetic layer comprises a layer of ferromagnetic material.

8. A medium according to claim 5, wherein said bias magnetic layer is premagnetized in a direction opposite to said predetermined direction of said external initializing magnetic field.

* * * * *